(12) United States Patent
Bing

(10) Patent No.: US 7,069,881 B2
(45) Date of Patent: Jul. 4, 2006

(54) COOLED RING CARRIER FOR A PISTON

(75) Inventor: Karlheinz Bing, Remseck (DE)

(73) Assignee: MAHLE GmbH, Stuttgart (DE)

( * ) Notice: Subject to any disclaimer, the term of this patent is extended or adjusted under 35 U.S.C. 154(b) by 0 days.

(21) Appl. No.: 10/483,783

(22) PCT Filed: Jun. 26, 2002

(86) PCT No.: PCT/DE02/04370

§ 371 (c)(1),
(2), (4) Date: May 12, 2004

(87) PCT Pub. No.: WO03/021137

PCT Pub. Date: Mar. 13, 2003

(65) Prior Publication Data

US 2004/0173169 A1    Sep. 9, 2004

(30) Foreign Application Priority Data

Jul. 14, 2001    (DE) ................... 101 34 293

(51) Int. Cl.
*F16J 9/00*    (2006.01)
(52) U.S. Cl. .................................. 123/41.34
(58) Field of Classification Search ............ 123/41.34, 123/41.35, 41.36, 41.37
See application file for complete search history.

(56) References Cited

U.S. PATENT DOCUMENTS

| | | | | | |
|---|---|---|---|---|---|
| 4,120,081 | A | * | 10/1978 | Rosch et al. ............ | 29/888.045 |
| 4,368,697 | A | * | 1/1983 | Moebus .................... | 123/41.35 |
| 4,470,375 | A | * | 9/1984 | Showalter ................ | 123/41.35 |
| 4,493,292 | A | * | 1/1985 | Showalter ................. | 123/41.2 |
| 4,502,422 | A | * | 3/1985 | Brann ...................... | 123/41.35 |
| 4,587,932 | A | * | 5/1986 | Moebus .................... | 123/41.35 |
| 4,907,545 | A | | 3/1990 | Mills | |
| 6,105,540 | A | * | 8/2000 | Bing et al. .............. | 123/41.35 |
| 2004/0177503 | A1 | * | 9/2004 | Bing et al. ............. | 29/888.044 |
| 2004/0177504 | A1 | * | 9/2004 | Bing et al. ............. | 29/888.044 |
| 2004/0177505 | A1 | * | 9/2004 | Bing et al. ............. | 29/888.044 |
| 2004/0194308 | A1 | * | 10/2004 | Bing et al. ............. | 29/888.044 |

FOREIGN PATENT DOCUMENTS

| | | |
|---|---|---|
| DE | 1795994 | 9/1959 |
| DE | 3836190 | 5/1990 |
| DE | 19813430 | 11/1998 |
| DE | 19833604 | 2/1999 |
| DE | 197 50 021 | 5/1999 |
| DE | 19825860 | 12/1999 |
| DE | 10057366 | 5/2002 |
| DE | 10103896 | 8/2002 |
| FR | 2818317 | 6/2002 |
| JP | 05420347 | 9/1993 |

* cited by examiner

*Primary Examiner*—Henry C. Yuen
*Assistant Examiner*—Jason Benton
(74) *Attorney, Agent, or Firm*—Collard & Roe, P.C.

(57) ABSTRACT

The invention relates to a cooled ring carrier that is cast into a piston for internal combustion engines. According to the invention, the zone of the ring carrier facing the cooling channel is coated, thereby preventing air from escaping from the cooling channel through the ring carrier material to the melt during alfination of the cooled ring carrier, and forming oxides.

1 Claim, 1 Drawing Sheet

COOLED RING CARRIER FOR A PISTON

CROSS REFERENCE TO RELATED APPLICATIONS

Figure 1:
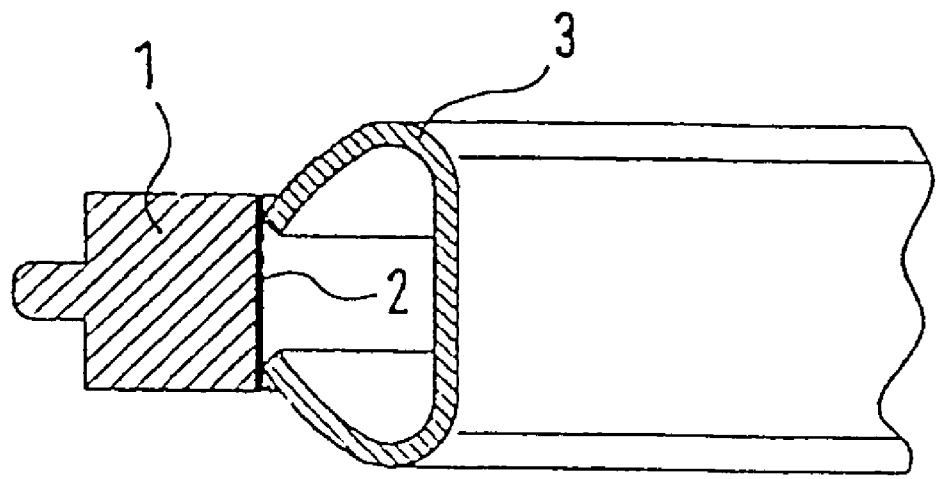

Applicant claims priority under 35 U.S.C. §119 of German Application No. 101 34 293.4 filed on Jul. 14, 2001. Applicant also claims priority under 35 U.S.C. §365 of PCT/DE02/04370 filed on Jun. 26, 2002. The international application under PCT article 21(2) was not published in English.

The invention relates to a cooled ring carrier for a piston of a diesel engine, according to the preamble of claim 1.

Such a ring carrier is known from DE 197 50 021.

Ring carriers are dipped into an aluminum/silicon melt before having piston material cast around them, whereby a so-called alfin layer, consisting of iron aluminides, is formed. This alfin layer serves as a binder layer between the piston material and the ring carrier material.

It has now been shown that in the formation of the alfin layer, air escapes from the ring carrier, in part, as the result of temperature-related excess pressure and gas permeability of the Niresist material, and that oxide formation occurs at the cooling channel. Therefore the formation of a good alfin layer does not succeed in all cases.

The invention therefore concerns itself with the problem of avoiding oxide formation on the ring carrier during alfination. This problem is solved by the characterizing feature of claim 1. Advantageous further developments are the object of the dependent claims.

The fundamental idea of the invention is to coat the region of the ring carrier that faces towards the sheet-metal cooling channel, in order to prevent an escape of air through the ring carrier material. It is advantageous if the coating process takes place by means of electroplating.

The invention will be explained in greater detail below, using an exemplary embodiment.

Figure 2:
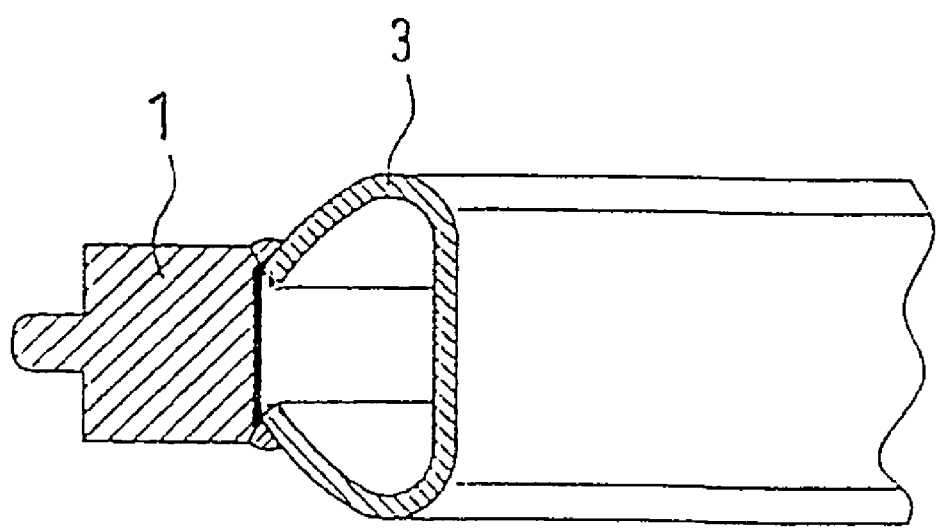

The drawing shows:

FIG. 1 and FIG. 2 a cooled ring carrier.

The ring carrier 1 is welded to the sheet-metal part 3, which is open towards the ring carrier. On its surface that faces radially inward, the ring carrier has a coating 2, so that the ring carrier is gas-tight towards the sheet-metal part. The sheet-metal part 3 consists of V2A steel or similar materials and is gas-tight. Nickel, chrome, or iron materials are particularly possible as layer materials.

The invention claimed is:

1. Cooled ring carrier for a piston of a diesel engine, comprising:
    a ring carrier part; and
    a sheet-metal part consisting of V2A steel which is welded to the ring carrier part and which is open towards the ring carrier part and forms a closed cooling channel together with the ring carrier part;
    wherein at least a surface of the ring carrier part that faces towards the sheet-metal part has a gas-tight coating selected from the group consisting of nickel, chrome and iron.

* * * * *